Oct. 21, 1930.  J. R. WEATHERLY  1,779,300
ANIMAL TRAP
Filed Jan. 11, 1930   3 Sheets-Sheet 1
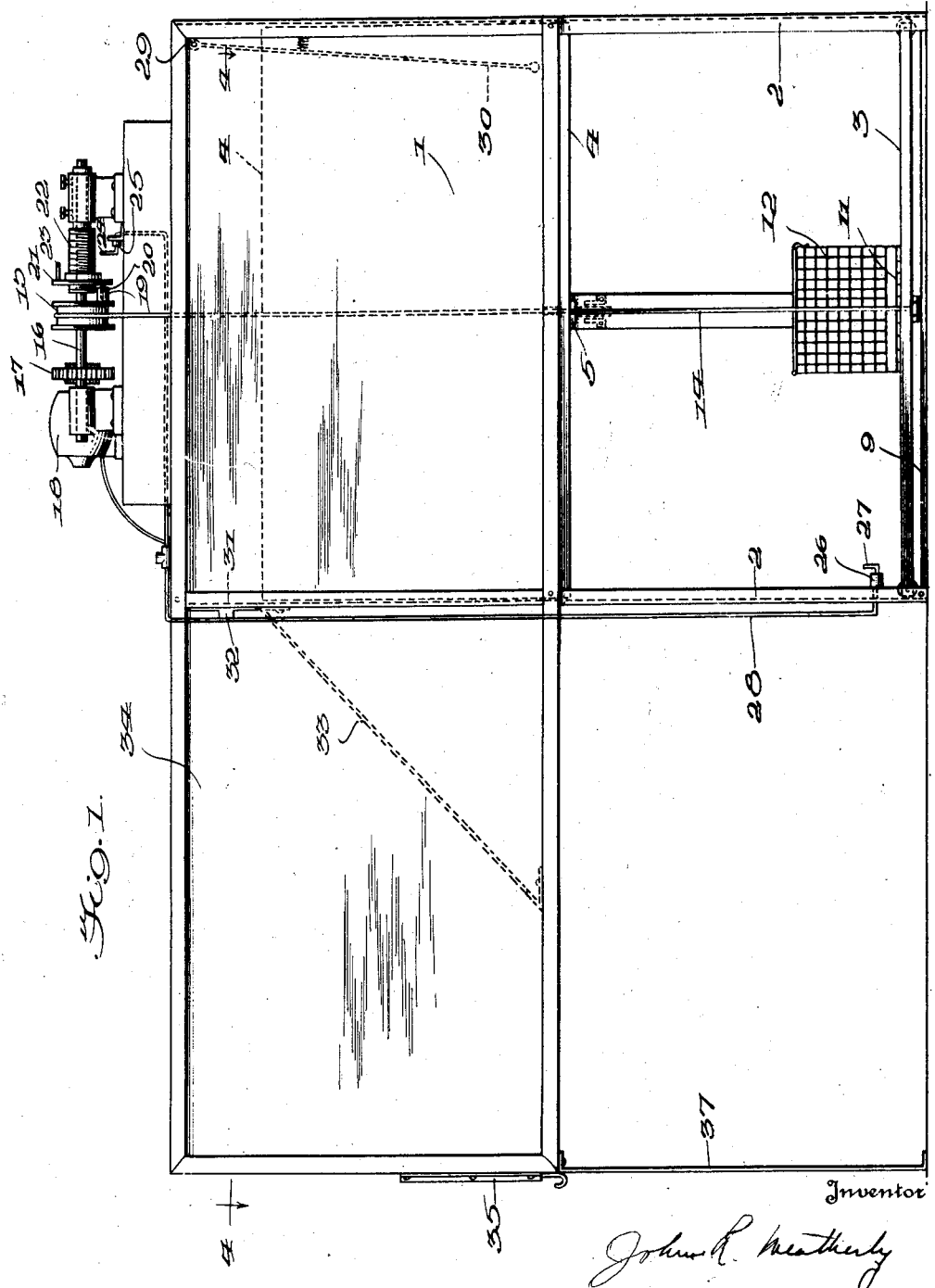
Inventor
John R. Weatherly
By Vernon E. Hodges
Attorney

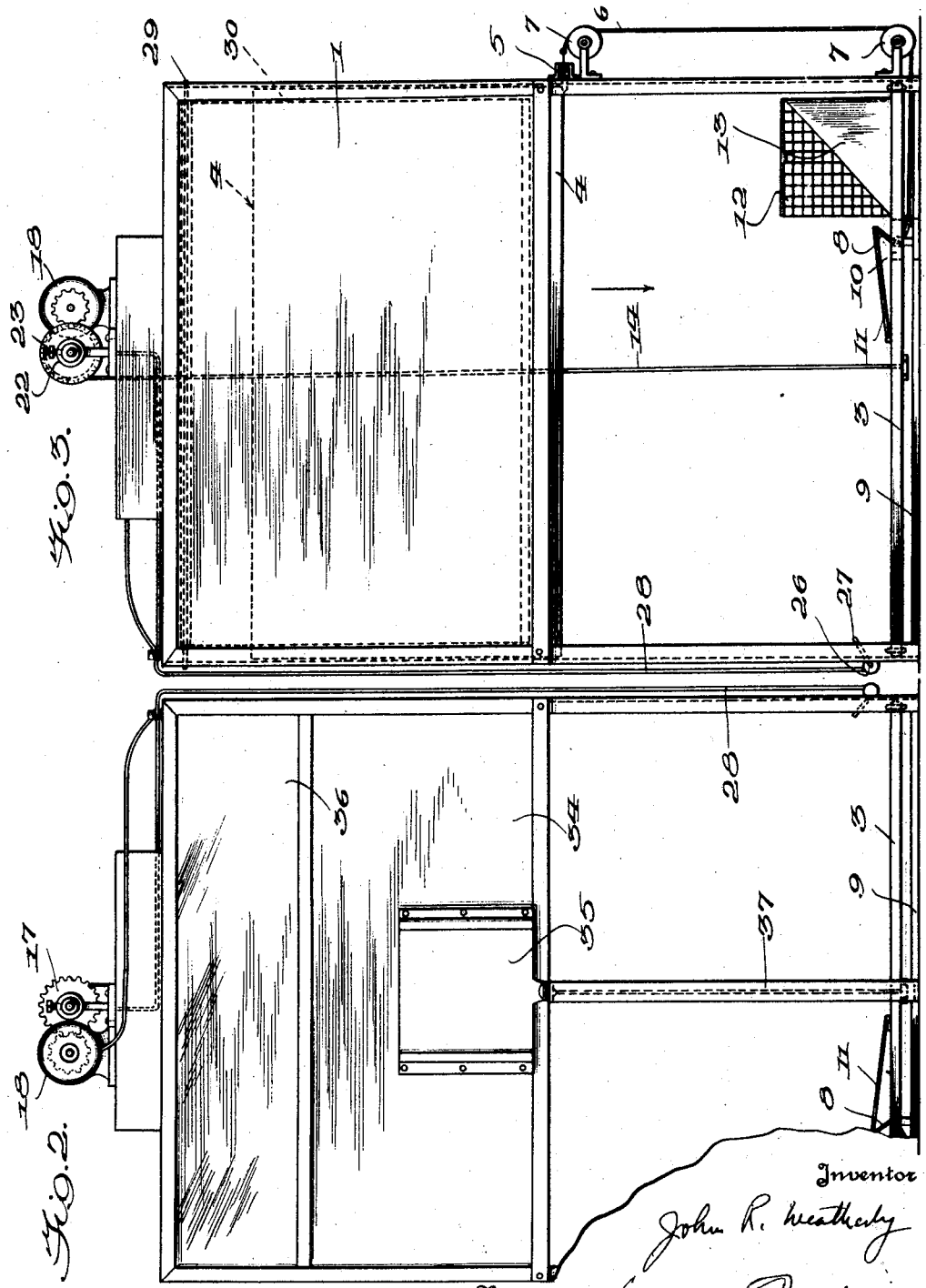

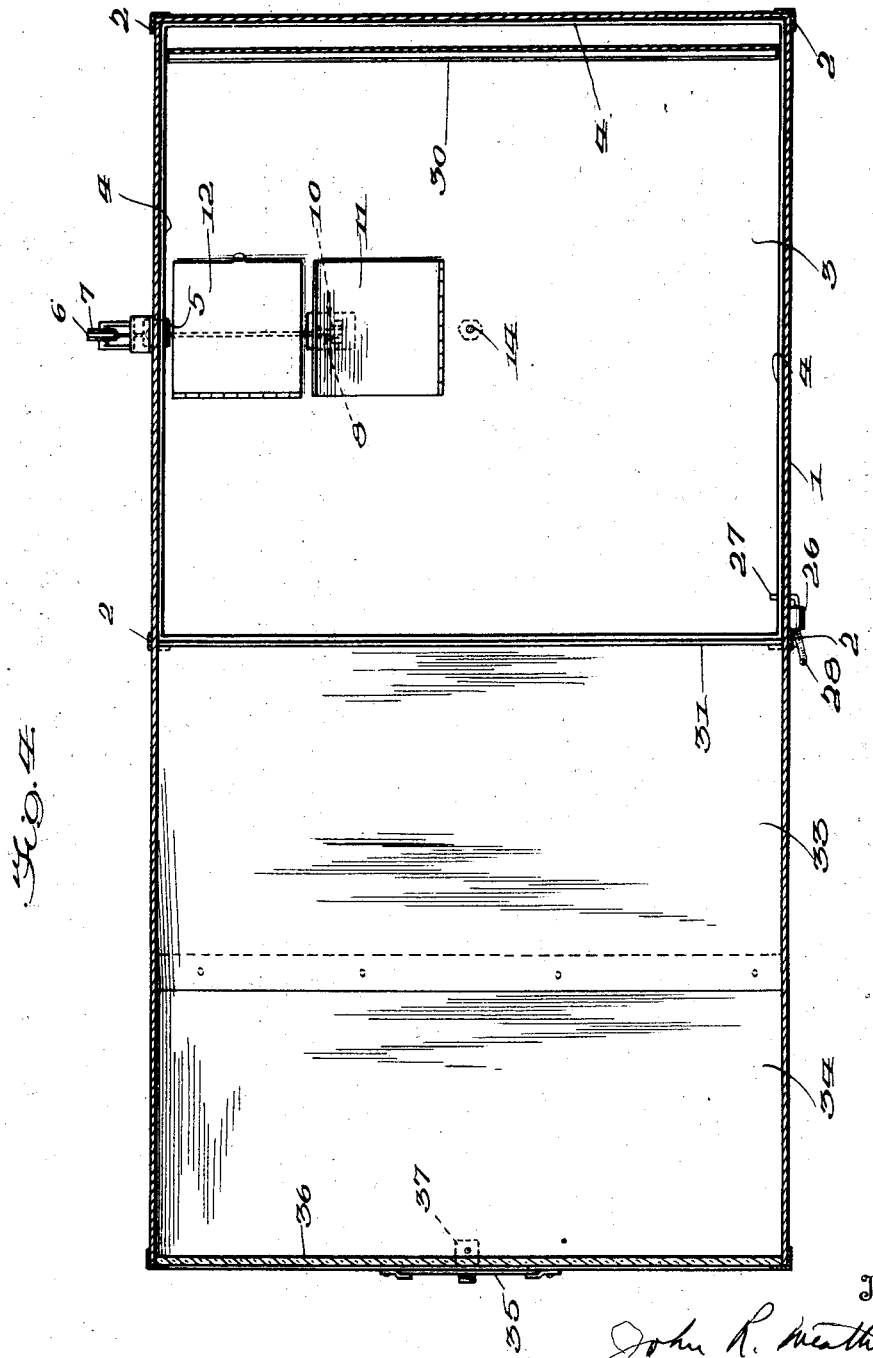

Patented Oct. 21, 1930

1,779,300

UNITED STATES PATENT OFFICE

JOHN R. WEATHERLY, OF SUMTER, SOUTH CAROLINA, ASSIGNOR OF ONE-HALF TO TERESA M. CHANDLER, OF SUMTER, SOUTH CAROLINA

ANIMAL TRAP

Application filed January 11, 1930. Serial No. 420,161.

This invention relates to an improvement in animal traps.

The object of the invention is to improve and simplify the manner and principle of trapping various animals, such as rats or the like, and to provide for automatic self resetting of the trap after one or more rats have been caught.

In the accompanying drawings:

Fig. 1 is a side elevation of the trap;

Fig. 2 is an end view thereof;

Fig. 3 is an end view of the opposite end; and

Fig. 4 is a horizontal section on the line 4—4 of Fig. 1.

A cage is designated generally by the numeral 1, being enclosed on all four sides by sheet metal or the like, but has the bottom open. This cage is supported by angle iron guides 2 at the corners. A platform 3 is mounted to slide upward in the angle guides 2 and into the cage 1, as will be hereinafter described. The space within the angle irons 2 below the cage 1 is normally open, although one or more of the sides may be permanently closed if desired.

Doors 4 are slidably mounted within the cage 1 to be lowered into the open spaces beneath the cage to close the latter whenever the platform 3 rises. These doors are normally held in their elevated positions, shown in Fig. 1, by means of suitable latches 5 shown in Fig. 3, and which are spring-pressed but have connected therewith a cable 6 which passes over pulleys 7 and extends down the back and along the bottom of the trap to a bell-crank lever 8, which is carried by the main base of the trap 9, and which bell crank lever normally extends up through a slot 10, formed in the platform 3. A treddle 11 is pivotally mounted on the platform 3 in position to engage the bell-crank lever 8 to actuate the same and release the doors 4 whenever a rat steps on this treddle.

A bait cage 12 is mounted on the platform 3 to contain the bait, which may be alive, such as a chicken or the like, and which cage may be partially closed on one or more sides, as at 13. The platform 3 is suspended by means of a cable 14, which extends upwardly through the cage 1 and is wound onto a drum 15 fixed on the shaft 16, geared as at 17 to a small motor 18. The motor illustrated is of the electric type, but other forms may be used as found desirable, as for instance a spring motor.

The drum 15 has an arm 19 connected therewith in position to engage a pin 20 extending outwardly from the disk 21, which is threaded onto a fixed screw 22, in which the shaft 16 may be journaled.

As the drum 15 is rotated, this turns the disk 21 and causes it to feed lengthwise of the screw 22 until a pin 23 carried by the disk engages an arm 24 of a suitable switch 25 for breaking the electric circuit which extends to the motor 18, thus disconnecting the motor, and if desired this switch may cause a reversing of the motor to unwind the cable 14. An electric switch 26 has an operating arm 27 connected therewith and is disposed near the bottom of one of the angle iron guides 2 in position to be engaged by one of the doors 4 as it descends. This switch 26 is connected through an electric cable 28 with the motor 18 and switch 25 so that when the doors are lowered the circuit is closed to cause operation of the motor and a winding up of the cable, which therefore raises the platform 3.

Disposed within the cage 1 and pivotally mounted as at 29 is a strip or leaf 30 designed to be engaged by the platform 3 as the same is elevated to force the rat off of the platform and through a doorway 31, which may be automatically closed by a sliding door 32 or the like, manipulated by the platform as it reaches a predetermined elevated position. The rat is driven down an incline 33 in a rat compartment 34, from where it may be removed through a door 35. A portion of the end of the rat compartment 34 opposite the doorway 31 may be of glass or the like to provide light for this compartment, in order that the rat will have a tendency to pass into it. This portion is designated by the numeral 36 in Fig. 2.

The rat compartment 34 is supported at one side of the cage 1 and has a leg 37 for supporting the outer end thereof. In using the trap, the doors 4 are normally elevated in the position shown in Fig. 1, where they are held by means of one or more latches 5. The bait is placed in the cage 12 to attract the rats or other animals to be trapped and the cage is encased on suitable sides to cause the rats to step on the treddle 11 in attempting to get to the bait. This depresses the treddle and actuates the bell-crank 8 to release the latch 5, which allows the doors 4 to drop and enclose the rat on the platform 3 to prevent its escape therefrom. In falling, the doors 4 engage the arm 27 of the switch 26 and manipulate the switch to close the electric circuit to the motor 18, thus actuating the motor to rotate the shaft 16 and drum 15 and wind up the cable 14, thus elevating the platform 3 into the cage 1. The platform engages the lower edge or the leaf of the plate 30, which swings inward and tends to force the rat from the platform as the latter nears its uppermost position, the rat passing through the doorway 31 into the rat compartment 34, from where it may be removed as desired.

As the platform nears its uppermost position, the drum 15 is rotated sufficiently to turn the disk 21 to move the same lengthwise of the screw 22 to cause the pin 23 to engage the arm 24 of the switch 25, which thus breaks the electric circuit to the motor and, if desired, reverses the motor to again lower the platform, suitable provision being made for the forcing of the rat into the rat compartment 34 and the closing of the door 32, so that the rat will not be released. The doors 4 may then be raised and held by the latch 5, and the trap is then reset for further use.

I claim:

1. A trap of the character described comprising a cage having an opening in the bottom thereof, guides extending downwardly from said opening, a door slidably mounted in the guides, and means for releasing the doors to cause a closing of the space about the opening.

2. A trap of the character described comprising a cage having an opening in the bottom thereof, guides extending downwardly from the opening, doors slidably mounted in the guides, a platform, and means operative from the platform to hold the doors in elevated positions and to release the doors to close the space about the opening.

3. A trap of the character described comprising a cage having an opening in the bottom thereof, guides extending downwardly from said opening, a platform slidably mounted in the guides to be moved upwardly into the opening, a door held suspended and to be lowered about the platform, and means for raising the platform into the opening.

4. A trap of the character described comprising a cage having an opening in the bottom thereof, guides extending downwardly from said opening, a platform mounted for upward movement in the guides, doors slidably mounted in the guides to be lowered about the platform for enclosing the same, means for holding said doors in suspended positions and for releasing the same, and means for operating said holding means from the platform.

5. A trap of the character described comprising a cage having an opening in the bottom thereof, guides extending downwardly from said opening, a platform mounted for upward movement in the guides, doors slidably mounted in the guides to be lowered about the platform for enclosing the same, means for holding said doors in suspended positions and for releasing the same, means for operating said holding means from the platform, hoisting means for lifting the platform into the cage, and means controlled by the lowering of the doors for causing an actuation of the hoisting means.

6. A trap of the character described comprising a cage, a platform suspended beneath the cage to be moved therein, means for closing the space about the platform during said movement, hoisting means for lifting the platform into the cage, means controlled by said closing means for causing an actuation of the hoisting means, and means actuated upon a predetermined movement of the hoisting means for disconnecting the same.

7. A trap of the character described comprising a cage, a platform mounted for upward movement therein, an outlet opening in one side of the cage, and a leaf or plate pivotally mounted for swinging movement on the opposite side of the cage to be engaged by the platform upon its upward movement and to be caused to swing across the surface of the platform.

8. A trap of the character described comprising a cage having an opening in the upper portion of a side thereof, means for lifting animals to be caught to said opening, to allow the same to pass therethrough, a compartment communicating with the cage through said opening and having an inclined bottom extending to the opening, and a light opening on the outer side of the compartment approximately in horizontal alignment with the first-mentioned opening.

9. A trap of the character described comprising a cage having an opening in the bottom thereof, guides extending downwardly from the cage, a platform mounted in the guides, said guides allowing relative movement between the platform and cage to cause a closing of the opening by the cage, and means for causing said relative movement.

In testimony whereof I affix my signature.

JOHN R. WEATHERLY.